Oct. 19, 1971   M. W. FORTH   3,613,335
MATERIAL COMPRESSING MACHINE
Filed Feb. 19, 1965   7 Sheets-Sheet 1
FIG. 1
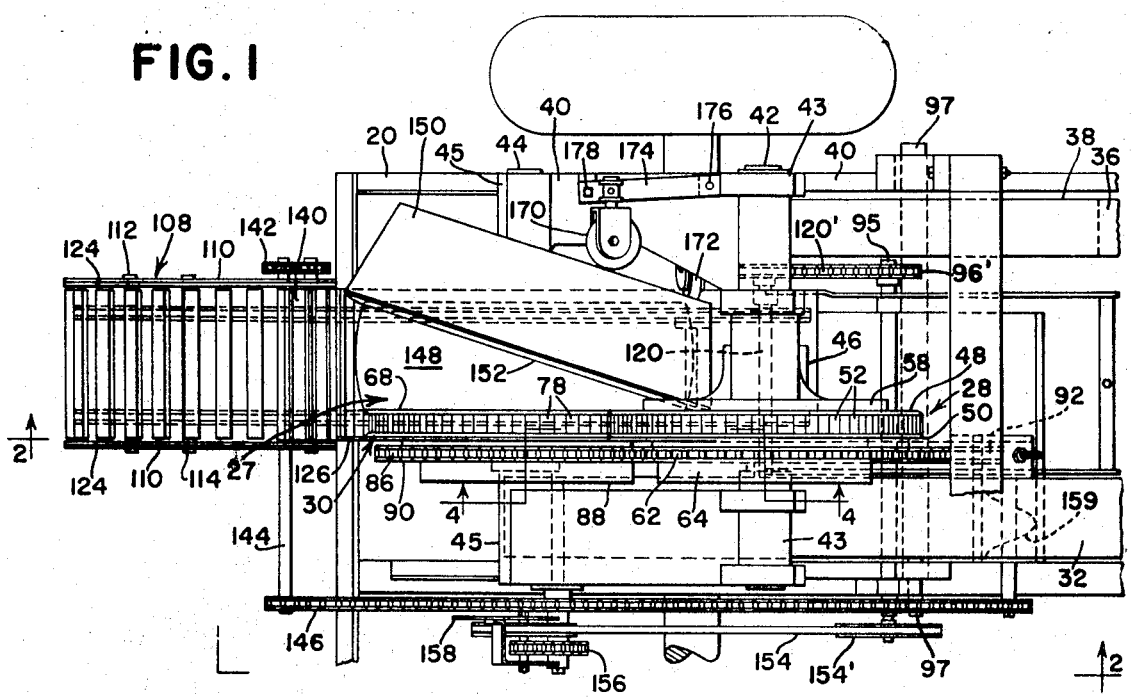
FIG. 12
FIG. 2
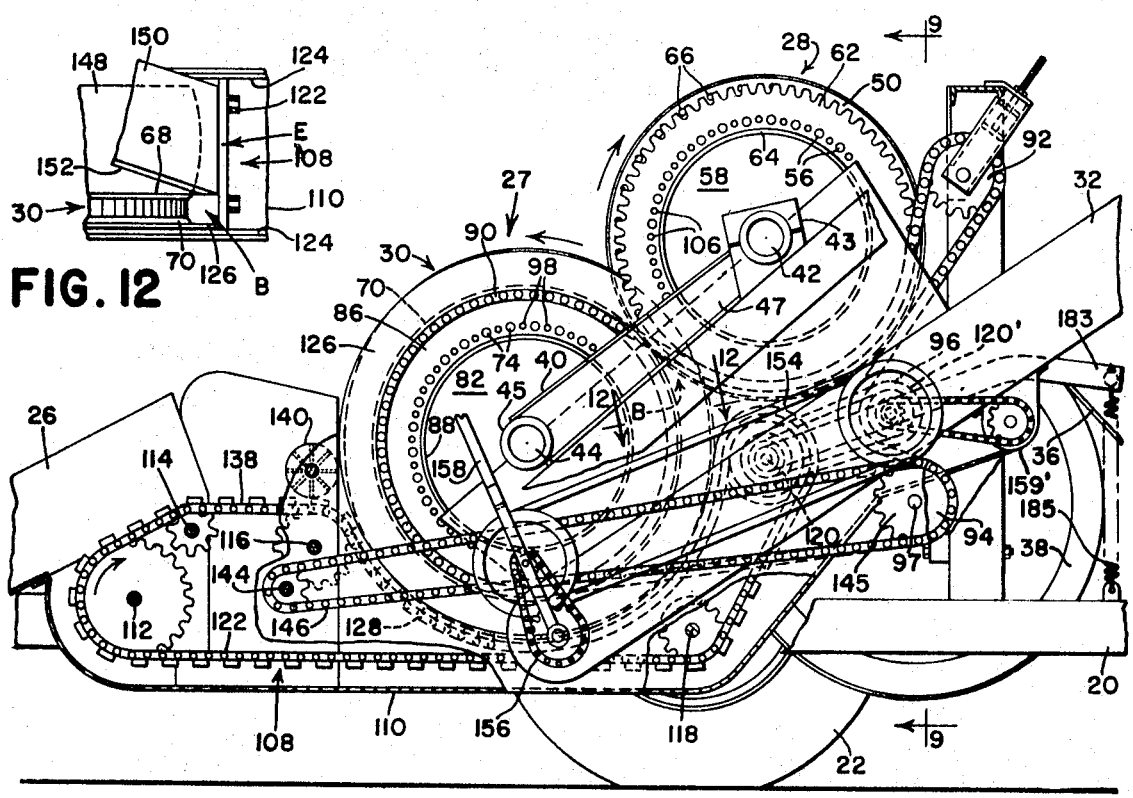
INVENTOR
M. W. FORTH Oct. 19, 1971   M. W. FORTH   3,613,335
MATERIAL COMPRESSING MACHINE Filed Feb. 19, 1965   7 Sheets-Sheet 2

INVENTOR
M. W. FORTH

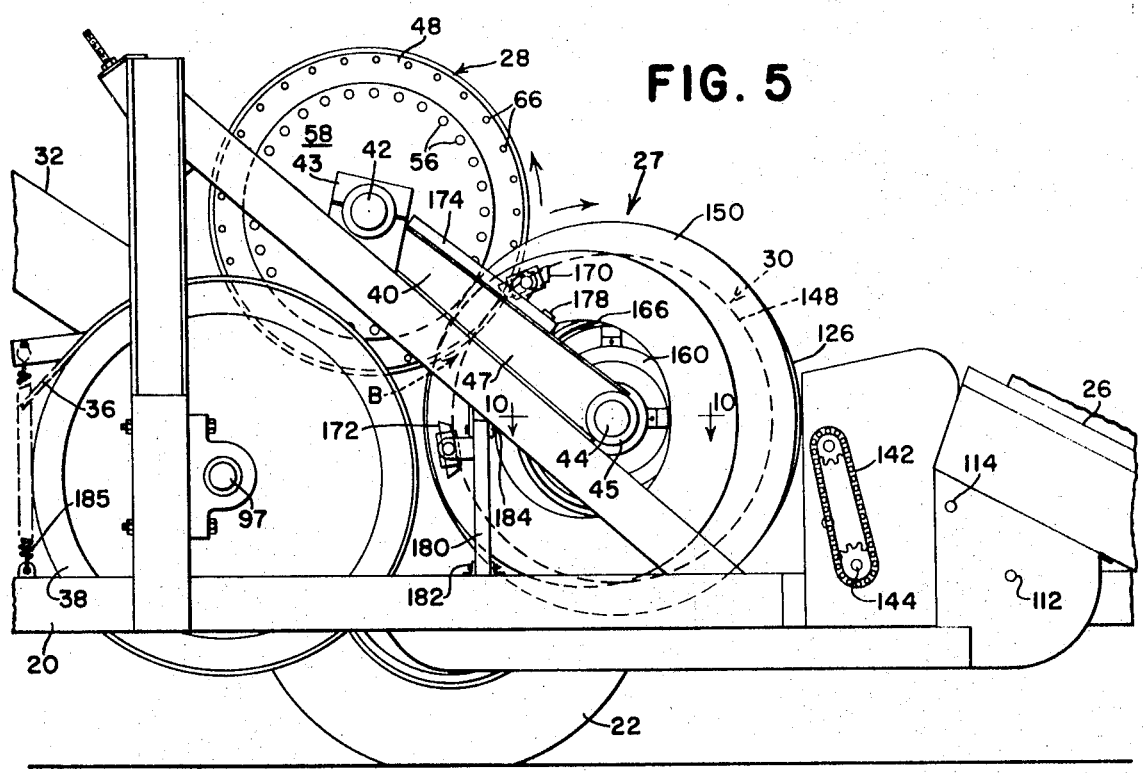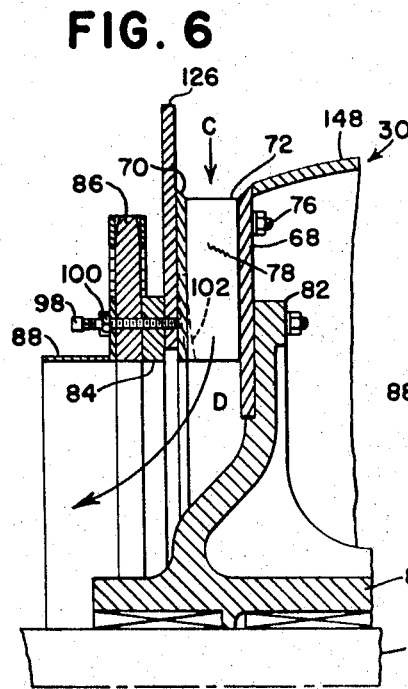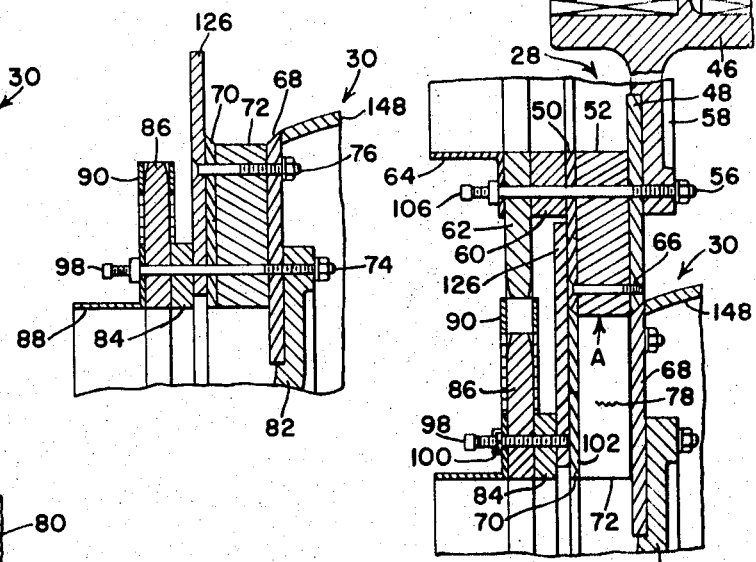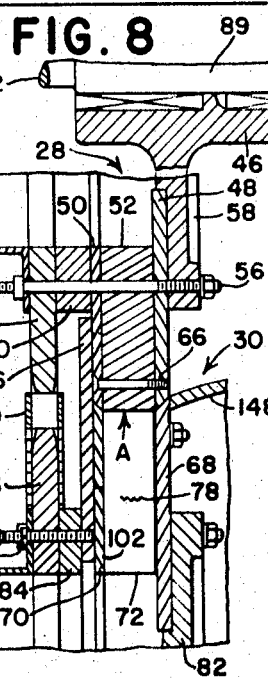
Oct. 19, 1971  M. W. FORTH  3,613,335
MATERIAL COMPRESSING MACHINE
Filed Feb. 19, 1965  7 Sheets-Sheet 5
FIG. 5
FIG. 6
FIG. 7
FIG. 8
INVENTOR
M. W. FORTH Oct. 19, 1971  M. W. FORTH  3,613,335
MATERIAL COMPRESSING MACHINE
Filed Feb. 19, 1965  7 Sheets-Sheet 4
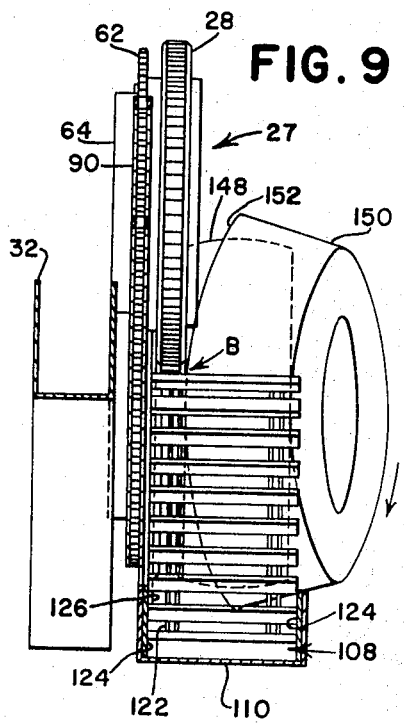
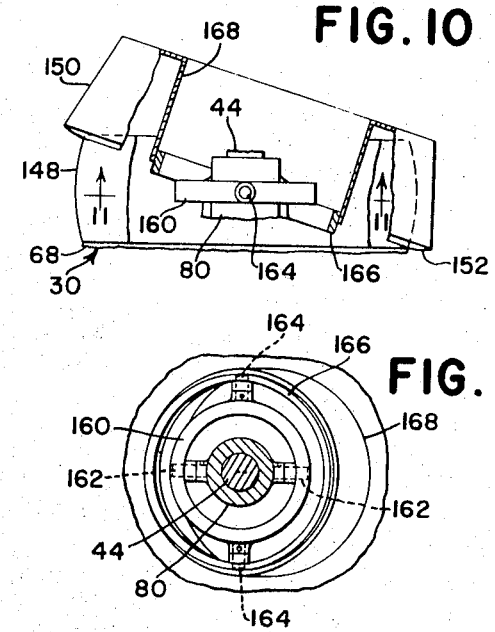
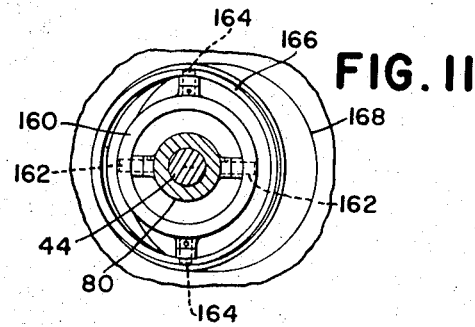
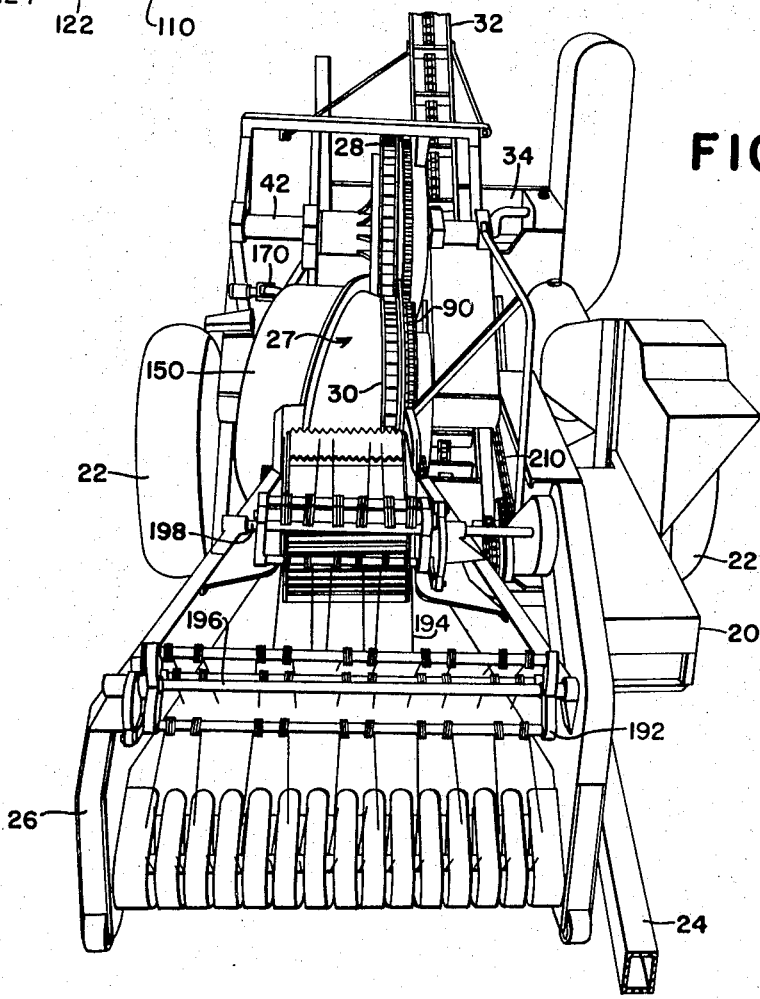
INVENTOR
M. W. FORTH

INVENTOR.
M. W. FORTH

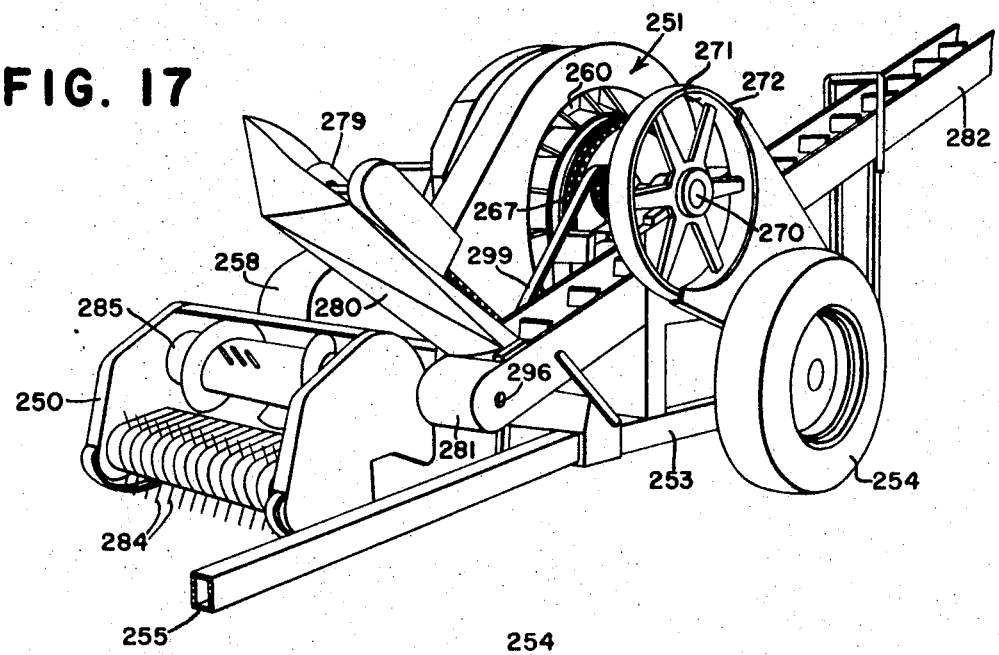
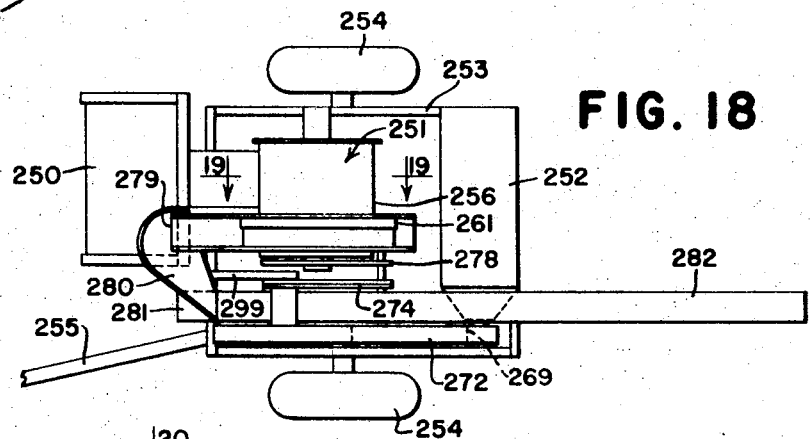
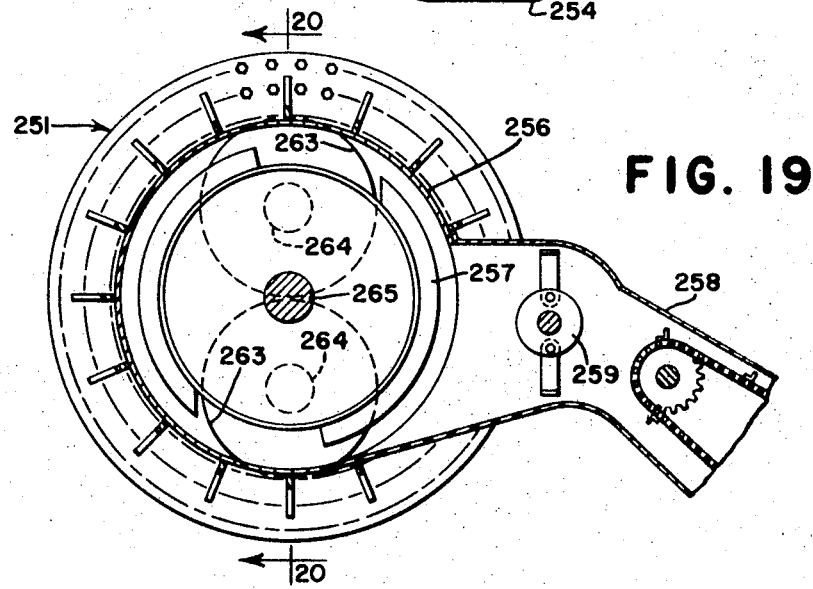

Oct. 19, 1971    M. WFORTH    3,613,335
MATERIAL COMPRESSING MACHINE
Filed Feb. 19, 1965    7 Sheets-Sheet 7

*INVENTOR.*
M. W. FORTH

United States Patent Office 3,613,335
Patented Oct. 19, 1971

3,613,335
MATERIAL COMPRESSING MACHINE
Murray W. Forth, Moline, Ill., assignor to
Deere & Company, Moline, Ill.
Continuation-in-part of application Ser. No. 661, Jan. 5, 1960. This application Feb. 19, 1965, Ser. No. 434,138
Int. Cl. A01d 49/00
U.S. Cl. 56—1                                        16 Claims This application is a continuation-in-part of copending application Ser. No. 661, filed Jan. 5, 1960, now Pat. No. 3,249,069, issued May 3, 1966, and the invention relates to a machine for compressing agricultural crops, for example, into relatively small high-density forms commonly known as wafers.

Machines for producing pellets in the form of relatively small articles for animal feed are known, but these machines handle products of granular or pulverulent nature, as distinguished from agricultural forage products such as hay and the like, which has heretofore been customarily processed as relatively large bales ranging from, say, 14 x 14 x 30 inches to 18 x 18 x 48 inches and upward and weighing in the order of from fifty to over one hundred pounds.

It is only relatively recently that interest has developed in the processing of forage crops into wafers compressed to an extremely high degree so that its total volume is on the order of two to fifteen cubic inches and its unit density is in the range of nineteen to sixty pounds per cubic foot. These factors will vary, of course, with the nature of the roughage and its moisture content. Present operations have been conducted with roughage having a moisture content in the area of fifteen to thirty-five percent.

It is a principal object of the invention to provide an improved machine of the character indicated, comprising essentially a mobile frame adapted to travel over a field of previously cut forage crops and having crop pick-up means, rotary wafering or die means and a power plant in substantial fore-and-aft alinement so as to reduce the width of the machine to a practicable minimum and at the same time to arrange these components in the most efficient and convenient order for operation, maintenance, adjustment, repair, etc. An important object of the invention is to provide improved drive means among the power plant, the die or wafering means and the power plant, and preferably to utilize, at least in part, endless flexible drive elements such as chains and belts and sprockets and sheaves or pulleys as the case may be. A further object is to provide improved conveyor or wagon elevator means for conveying the wafers from the wafering means to a trailing wagon. A still further object is to provide a machine of the character described in several forms and using different types of die or wafering means but embodying the same general principles of fore-and-aft alinement of operational components.

The foregoing and other important objects and desirable features inherent in and encompassed by the invention will become apparent as preferred embodiments thereof are disclosed in detail in the ensuing description and accompanying sheets of drawings, the several figures of which are described below.

FIG. 1 is a plan view, with portions broken away, of one embodiment of the machine.

FIG. 2 is a side view, partly in section, on the line 2—2 of FIG. 1.

FIG. 5 is a side elevation, with portions removed, as seen from the same side of the machine as shown in FIG. 3.

FIG. 6 is a fragmentary section on the line 6—6 of FIG. 4.

FIG. 7 is a fragmentary section on the line 7—7 of FIG. 4.

FIG. 8 is a fragmentary section as would be seen along the line 8—8 of FIG. 4 if FIG. 4 were in elevation.

FIG. 9 is a section on the line 9—9 of FIG. 2.

FIG. 10 is a section on the line 10—10 of FIG. 5.

FIG. 11 is a section on the line 11—11 of FIG. 10.

FIG. 12 is a fragmentary view, on an enlarged scale, on the line 12—12 of FIG. 2.

FIG. 13 is a perspective view, as seen from above and the front of the machine.

FIG. 17 is a perspective view of the machine of FIG. 16 as seen from the other side.

FIG. 18 is a plan, drawn to a reduced scale and omitting parts shown better in other views.

FIG. 19 is an enlarged section as seen generally along the line 19—19 of FIG. 18.

Figure 3:
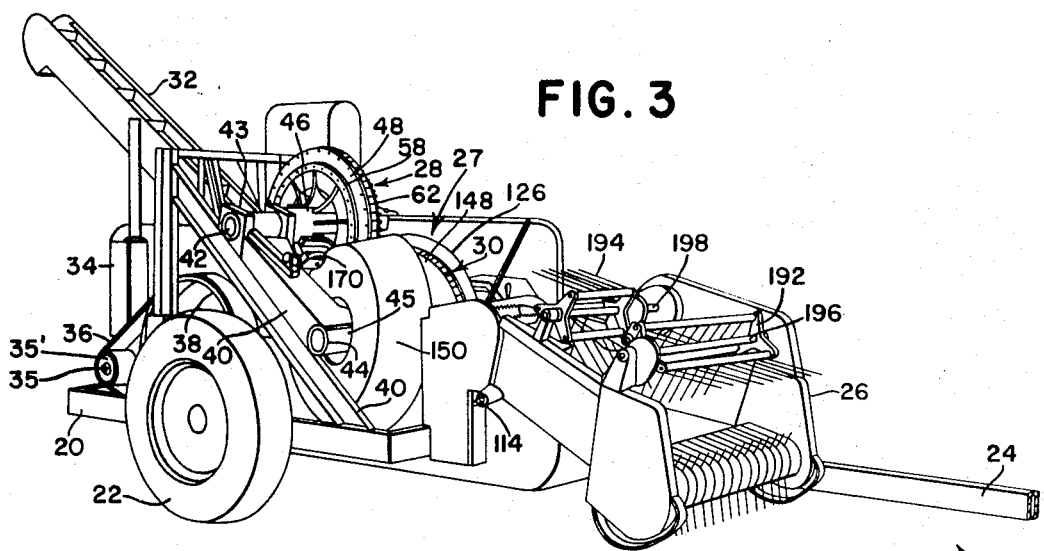
FIG. 3 is a perspective view as seen from the front and the side opposite to that shown in FIG. 2.

The machine, regarded in its entirety (FIG. 3), has a longitudinal main frame 20 carried by wheels 22 and having a draft tongue 24 for connection to a draft vehicle, and, being designed for operation in a field of previously cut forage crops, such as hay, and has at its forward portion, just to the right of the draft tongue 24, crop pick-up means 26, which may be of any well known type. The pick-up means, as will be brought out below, is generally centered on the fore-and-aft centerline or longitudinal axis of the frame 20 and picks up the crops from the ground and moves them rearwardly to feed means (to be described later) which in turn feeds the material ultimately to wafering means 27, including, among other elements to be described later, a pair of cooperative press and die wheels 28 and 30 which function as cooperative die or rotary compression means to compress and extrude the crops into wafer form; and these wafers are discharged laterally into an elevator or conveyor 32 for delivery to a trailing vehicle (not shown). The frame 20 has mounted crosswise thereof an internal combustion engine 34, the output shaft 35 of which carries a pulley 35' connected by a belt 36 to a flywheel pulley 38 for driving the several moving parts of the machine.

Figure 4:
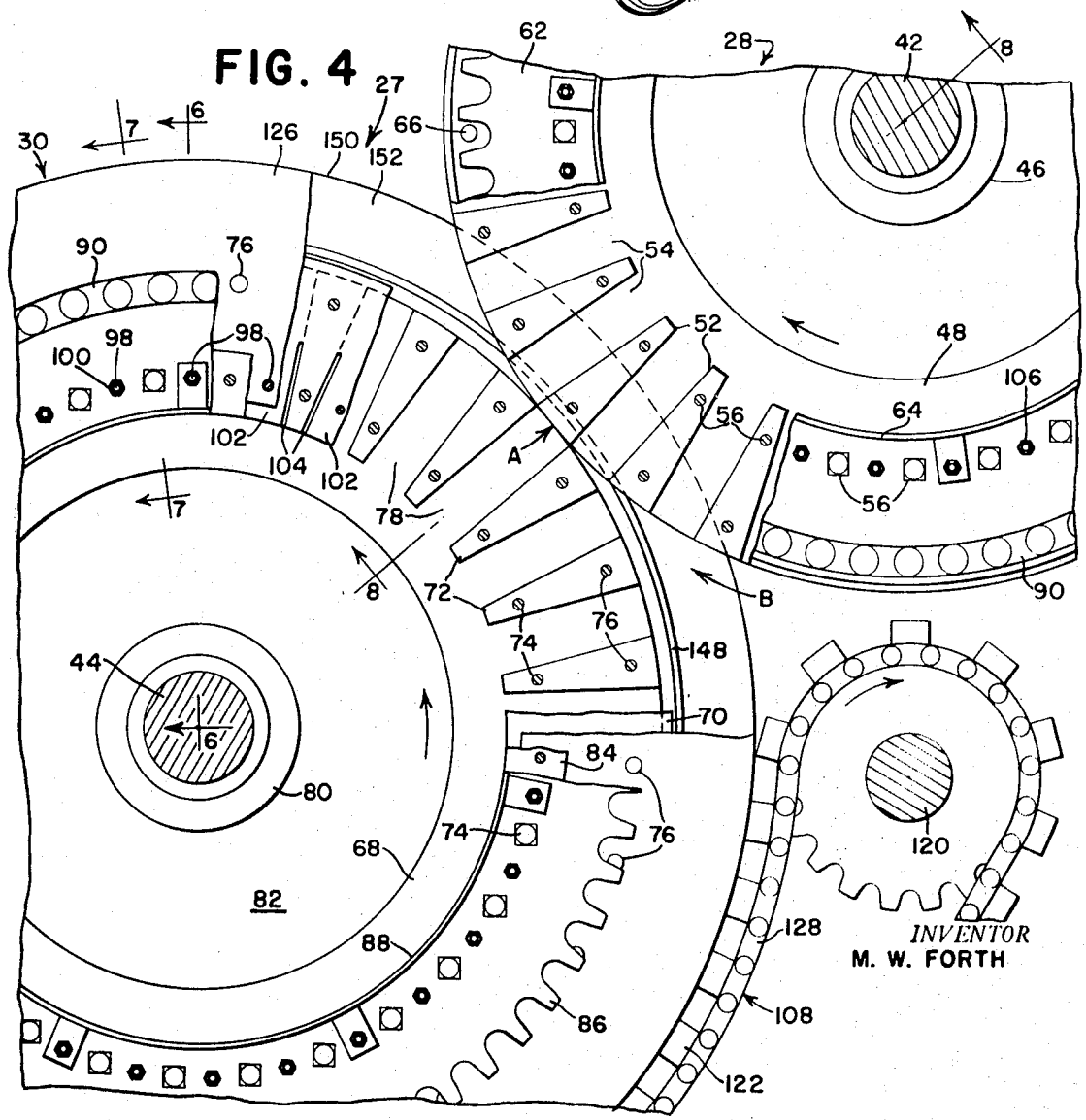
FIG. 4 is an enlarged fragmentary section taken generally on the line 4—4 of FIG. 1.

The rear or upper press wheel 28 is journaled on a cross shaft 42 carried by clamping blocks 43 on a subframe 40, and the lower or forward press wheel 30 is carried by a similar cross shaft 44 mounted in the subframe 45. The wheel 28 has a hub 46 and a concentric annulus made up of inner and outer plate-like rings 48 and 50 (FIG. 8) and a plurality of uniformly circumferentially spaced die blocks 52, thus providing die means including an annular plurality or circular series of die cells 54 (FIG. 4). Each cell lies on a radius of the wheel and has opposite ends opening respectively to the inner and outer peripheries of the wheel annulus. The rings and die blocks are rigidly secured together by bolts 56 which serve additionally to mount the annulus on an integral circular web 58 of the hub 46. A spacer ring 60 is coaxial at the opposite side of the wheel along with a sprocket 62 and a concentric discharge ring 64, all mounted by the bolts 56. The ring 64 is at the same side of the machine (left) as the conveyor 32 so that as the wafers are extruded through the cells 54 they move radially inwardly and are then discharged laterally to the conveyor. Here, as elsewhere in the description, the expressions "right" and "left" are used with reference to the position of a person standing behind the machine and facing forwardly, the direction of travel of the machine being apparent from FIG. 3, since the draft tougue 24 is at the front. The discharged wafers or pellets are thus caused to drop into the conveyor 32 for upward and rearward discharge as described generally above. The discharging relationship between the wheels 28 and 30 and conveyor 32 may also be seen in FIG. 9. In addition to the circle of bolts at 56, the die blocks 52 and plates 48 and 50 are rigidly cross connected by a second circle of cap screws 66.

The wheel 30 is substantially identical to that of the wheel 28 and comprises inner and outer rings 68 and 70 and die blocks 72 rigidly cross connected by bolts 74 and 76 to provide a plurality of die cells 78 identical to the die cells 54. The wheel 30 includes a hub 80 and an integral radial web 82. The bolts 74 mount, at the opposite side of the wheel, a spacer ring 84, a sprocket 86 and a discharge ring 88 which, like the ring 64 for the wheel 28, is at the side of the wheel facing and discharging into the conveyor 32.

The two wheels are arranged so that their rims or tracks lie substantially tangent to each other. The shaft 42 (FIG. 8) has a central portion 89 on which the wheel 28 is journaled and this portion is slightly eccentric to the remainder of the shaft so as to enable the shaft to be rotated, after the clamping blocks 43 are loosened, whereby the contact of the wheels at the point of tangency may be varied. The wheels are driven in the directions of the arrows indicated by endless flexible fore-and-aft means, here a drive chain 90 wrapped about the sprockets 62 and 86 (as best seen in FIG. 2) and additionally carried by upper, lower and intermediate sprockets 92, 94 and 96 respectively. The sprocket 96 is keyed to a cross shaft 95. The sprocket 94 is keyed to a wafering means input shaft 97 to which the flywheel 38 is also fixed. The engine shaft 35, input shaft 97, shaft 95 and the shafts for the sprockets 92 and 94 are parallel.

Because of the arrangement of the wheels 28 and 30, and the tangency of their rims or tracks, indicated by the letter A in FIG. 4, there is afforded just circumferentially ahead of the point A a bite B into which the crops are directed. The die cells 54 and 78 are here square in cross-section. The die cells may be adjusted at their outlet ends. FIG. 6 shows that the wheel 30 carries a circle of adjusting screws 98, each having a lock nut 100 and extending inwardly to that portion of the ring 70 between neighboring die blocks 72 as seen at 102 in FIG. 4. This portion is provided by a pair of slits 104 in the ring so that it is bendable inwardly when its screw 98 is tightened, as shown in dotted lines in FIG. 6, to reduce the cross sectional area of the outlet end of the cell, it being clear that the crops enter the cell in the direction of the arrow C and exit in the direction of the arrow D. The same type of arrangement is provided in the wheel 28, and the adjusting screws are visible at 106.

The means for feeding crops from the pick-up 26 to the bite B includes a conveyor 108 operating in a longitudinal trough 110 so as to underlie the wheels 28 and 30 in the area including the bite B. The trough 110 is spanned by parallel cross shafts 112, 114, 116, 118 and 120 which carry sprockets for mounting an endless conveyor chain 122 of the cross-slatted type. The upright walls of the trough 110 have wear strips 124.

The rims of the wheels 28 and 30 are relatively narrower than the conveyor 108, and the volume of relatively loose material on the conveyor must be narrowed for delivery to the bite B. To accomplish this, the conveyor follows a portion of the front press wheel 30, which has backing means in the form of a radial flange or ring 126 interposed between the sprocket 86 and the proximate ring 70 and having a diameter considerably greater than that of the rings 68 and 70 so that it overlaps the bite B at one side thereof, which here is the side closer to the conveyor 32. The slats of the conveyor bear against the edge of the ring 126 from below so that the conveyor in this area has an arcuate run 128 leading upwardly to and looped about the sprockets on the rearwardmost and uppermost shaft 120, which is driven by a belt or chain 120' from a pulley or sprocket 96' on the cross shaft 95. The lower run of the conveyor returns in the bottom of the trough 110, and the upper forward portion 138 of the conveyor between the sprockets on the shafts 114 and 116 is an inlet to or an extension of the arcuate run 128. An upper feed roll 140 cooperates with the conveyor portion 138 and, as shown in FIG. 5, is driven by a chain 142 from a cross shaft 144 which is driven at its opposite side by a chain 146 from a sprocket 145 on the wafer means input shaft 97.

The conveyor 108 travels in the direction indicated by the arrow on the sprocket on the shaft 112 to convey crops beneath the front press wheel 30 to the bite B for compression in and extrusion through successive cells as the cells in one wheel register successively with die blocks in the other wheel.

Part of the wafering means is a coaxial, partly spherical drum 148 rigid on the wheel 30 at the side thereof opposite to the sprocket 86. The drum 148 has a maximum diameter slightly larger than that of the ring 68 and its outer peripheral surface is spaced slightly above the tops of the slats of the conveyor 108 as these slats pass rearwardly beneath the drum so that crops on the conveyor are compressed between the drum and the slats.

FIG. 12 shows the relationship of the bite B as closed at one side by the backing ring 126 and illustrates further the relative widths of the press wheel 30 and the conveyor 108. A second drum 150 having an outer surface the section of a cone is rotatable on an axis which is angled to the axis of the shaft 44 and which intersects that axis as best shown in FIG. 10, and the outer surface of the drum will, in the area shown at E in FIG. 12, ride on the slats of the conveyor. The drum 150 includes, at its peripheral edge facing the wheel 30, a radial flange 152 which lies generally in a plane that converges toward the bite B relative to the plane of the backing ring 126. The drum 150 is hollow and loosely surrounds the drum 148 and the converging relationship is such that the forward portion thereof, relative to the backing ring 126, is spaced from the ring substantially the width of the conveyor 108. Hence, the material is not only compressed vertically or radially between the drum 148 and the conveyor but is also compressed axially between the flange 152 and the backing ring 126 so that the crops are led into the bite B as a narrowed stream and thence into the die cells.

The elevator 32 is driven by a belt 154 driven from a sheave 154' on the shaft 95, plus an auxiliary chain 156 associated with a lever 158 which establishes a clutch relationship for engaging and disengaging the drive to the conveyor. A transverse auger 159 operates in a trough 159' beneath the slatted floor of the elevator 32 for returning to the conveyor 108 any fragments of material that are not in wafer form.

The mounting of the conical-section drum 150 for rotation with the spherical-section drum 148 and wheel 30 so that all rotate in unison but about different axes is best illustrated in FIGS. 10 and 11, wherein it is shown that the hub 80 of the wheel 30 carries a spider 160 rockably connected to the hub by diametrically opposed pintles 162. The spider has a second pair of pintles 164 which lie on a common diameter 90° from the axis of the pintles 162 and these carry a ring 166 rigid with a collar 168 which is in turn rigid with the drum 150 so that the drum 150 is free to turn about its own axis as it rotates with the drum 148.

The angle of the drum 150 is maintained by a pair of rollers 170 and 172 (FIGS. 1 and 5) which bear against its outer surface. The roller 170 is mounted on an arm 174 pivoted at 176 to part of the frame 20 and held by a shear pin 178. The roller 172 is carried by an arm 180 pivoted to the frame 20 at 182 and held by a shear pin 184.

The shaft 120 is mounted at the forward end of a frame 183 which is rockable about the shaft 95 and spring-loaded at 185 so as to keep the arcuate run of the conveyor in conforming relation to the wheel 30 in the area leading to and including the bite B.

Figure 14:
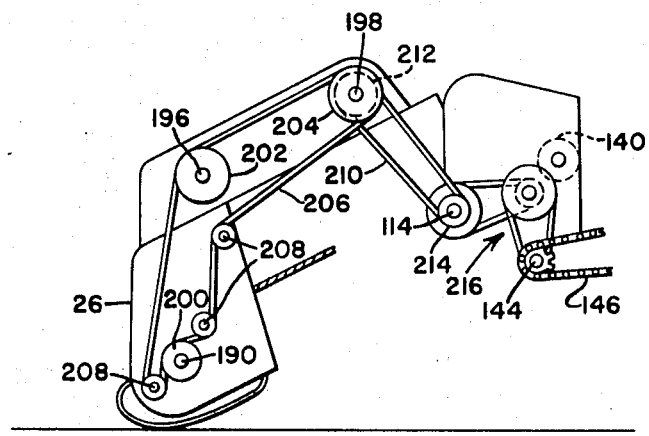
FIG. 14 is a fragmentary view, partly in section, of the forward portion of the machine, showing portions of the pick-up drive.
Figure 15:
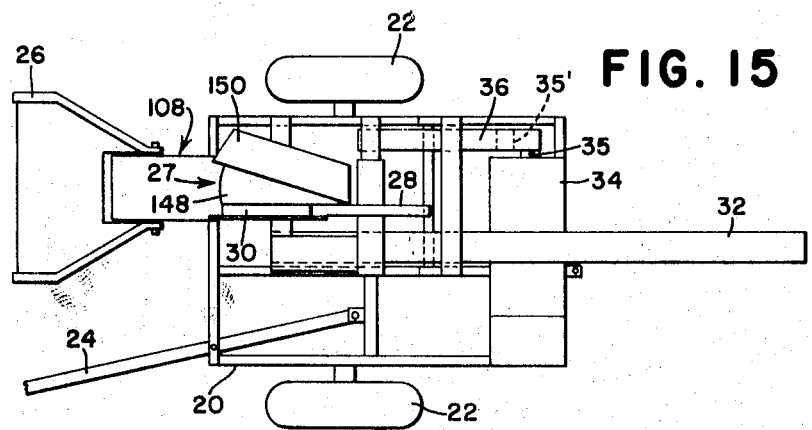
FIG. 15 is a plan view, drawn to a reduced scale and omitting, for the large part, mechanism shown better in other views.

The fore-and-aft drive means from the wafering means input shaft 97 to the pick-up 26 is best shown in FIG. 13. See also FIG. 14. The pick-up has a typical pick-up cylinder carried on a cross shaft 190 and a pair of overhead tined feeders 192 and 194 carried respectively on cross shafts 196 and 198. These three shafts are fitted respectively with sprockets or sheaves 200, 202 and 204 and a chain or belt 206 is trained about these and a plurality of idlers 208. A belt or chain 210 drives the shaft 198 via a sheave or sprocket 212 on that shaft and a part of a double sheave or sprocket 214 journaled on the shaft 114 and driven by belt and a pulley or chain and sprocket means 216 from the shaft 144. As preciously noted, the shaft 144 is driven by the chain 146 from the shaft 97.

FIG. 18 will first be referred to as giving an overall picture of the machine, particularly with respect to showing the fore-and-aft alinement of a pick-up 250, rotary die means 251 and an internal combustion engine 252, the latter being disposed crosswise of the basic main frame 253, carried by right- and left-hand wheels 254 and having a forwardly extending draft tongue 255.

Figure 20:
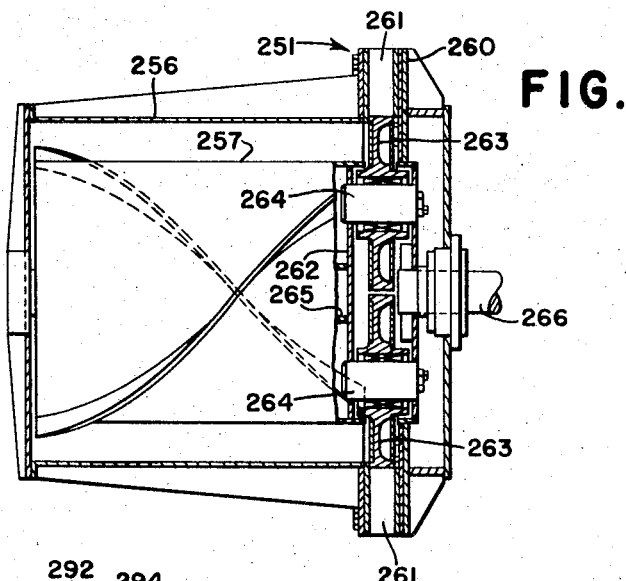
FIG. 20 is a section as seen along the line 20—20 of FIG. 19.
Figure 21:
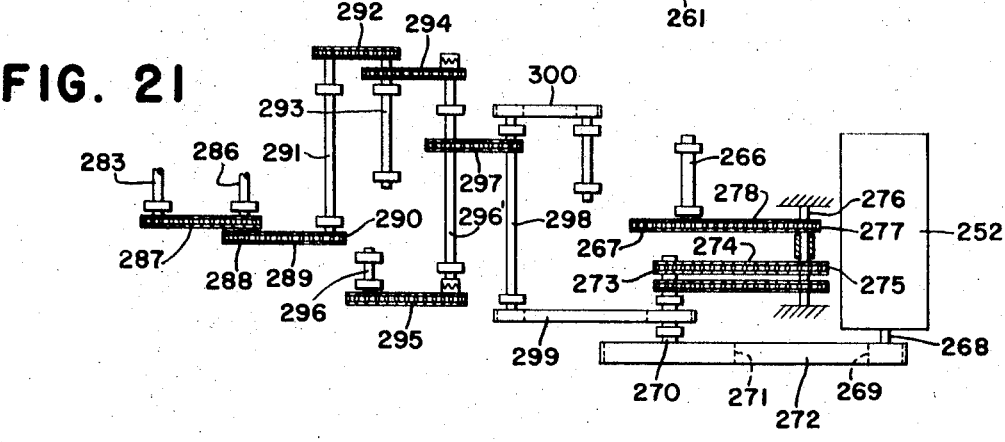
FIG. 21 is a schematic view illustrating the drive for the machine of FIGS. 16–20.

The rotary die means is best shown in FIGS. 19 and 20 as including a transverse auger housing 256 within which is an auger 257 that receives crops from the pick-up 250 via feed means 258, supplemented by a rotor means 259 that rotates in a clockwise direction as seen in FIG. 19. The auger feeds these crops axially across the housing 256 to a die annulus 260 which includes a plurality of uniformly circumferentially spaced radial die cells or openings 261. The right-hand end of the auger has coaxially affixed thereto a press roll carrier 262 which journals a pair of press wheels 263. These are mounted respectively on press wheel shafts 264 that are eccentric to the auger shaft 265 so that as the auger shaft turns in a clockwise direction as seen in FIG. 19, the peripheries of the press wheels roll about the inner track or periphery of the annulus, thus extruding crops radially outwardly through the die cells 261. The auger shaft 265 is of course transverse to the fore-and-aft extent of the machine and it is provided at its left-hand end with a coaxial extension 266 on which is keyed a large rotary drive member, here a sprocket 268 (FIG. 21). See also FIG. 17.)

The engine has an output shaft 268 (FIG. 21) on which is keyed a belt pulley 269. A forwardly located jackshaft 270 is parallel to the engine shaft 268 and carries a large belt pulley 271. A belt 272 drivingly connects the engine pulley 269 and the jack shaft pulley 271. This belt is largely shielded in FIG. 17.

The inner end of the jackshaft 270 has keyed thereto a double sprocket 273 which, by means of a chain 274, drives a double sprocket 275 on a short cross shaft 276, journaled just ahead of the engine 252. A third sprocket 277 on the shaft 276 is connected by a driven chain 278 to the large sprocket 267 on the auger and press wheel carrier 266. Thus, the rotary parts of the die means 251 are driven by means including the belt and sheave drive means 269–271–272.

Wafers extruded through or discharged by the radial die cells 261 of the die annulus 260 fall into the bottom end of an upwardly and forwardly inclined conveyor 279 which conveys the wafers upwardly and to the left so that they may slide down a chute 280 into the lower forward end 281 of a conveyor that extends upwardly and rearwardly at 282 for the same purposes as the elevator 32 in the machine of FIGS. 1–13.

Figure 16:
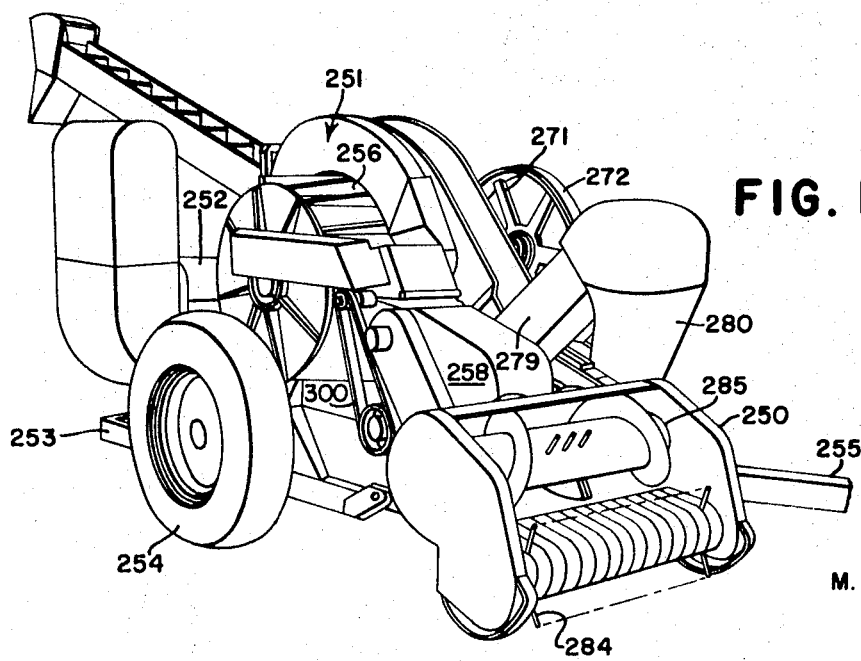
FIG. 16 is a perspective, as seen from the right side and the front, of a modified form of wafering machine.

The pick-up 250 has a transverse front shaft 283 (FIG. 21) which carries a plurality of pick-up tines 284 (FIGS. 16 and 17). These tines deliver upwardly and rearwardly to a compressing auger 285 which is carried on an auger shaft 286 (FIG. 21). The shafts 283 and 286 are connected by chain and sprocket means 287.

The auger shaft 286 carries a second sprocket 288 which is connected by a chain 289 to a sprocket 290 at the left-hand end of a transverse jackshaft 291. The jackshaft is connected at its right-hand end by chain and sprocket means 292 to a shaft 293 that drives the conveyor 279. This shaft is in turn connected by chain and sprocket means 294 to a cross shaft which is connected at its left-hand end by chain and sprocket means 295 to a driving shaft 296 for the elevator 282. The cross shaft just referred to is shown at 296' as having a chain and sprocket connection 297 to another cross shaft 298 which is belt driven at its left-hand end by belt and pulley means 299 from the main jackshaft 270. The right-hand end of the shaft 298 drives a shaft for the rotary feed means 259 by means of a belt 300. Thus, the rotary parts of the machine are driven from the internal combustion engine 252 via the drive means just described.

Figure 22:
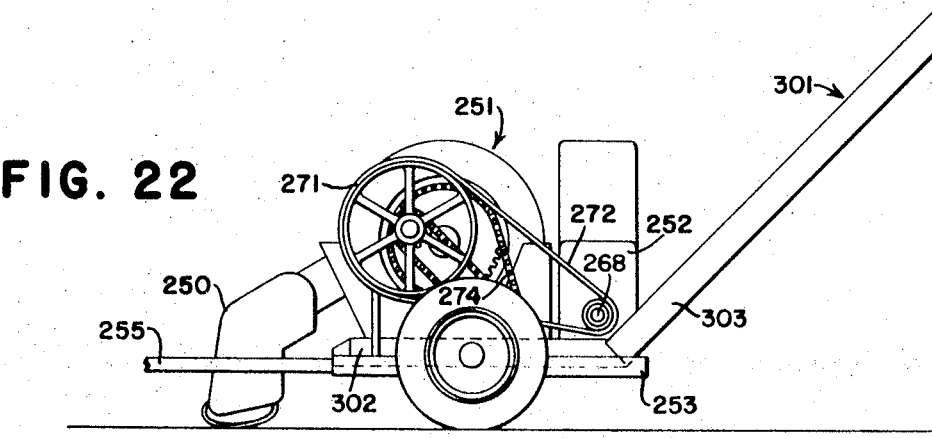
FIG. 22 is a view, drawn to a reduced scale, and as seen from the left side, of a machine that is slightly modified over that of FIGS. 16–21.

FIG. 22 shows a modified form of construction in which the elevator 282 is replaced by an elevator 301. This elevator comprises a bottom horizontal section 302 which lies directly below the die annulus 261 so as to receive the wafers directly therefrom rather than resorting to the conveyors 279 and 280. The portion 302 extends rearwardly beneath the die means as described and has a rearward junction with an upwardly and rearwardly inclined portion 303 of the elevator. In plan, the machine shown in FIG. 22 would have an appearance identical to that shown in FIG. 18, except that the elevator would be displaced to the right so as to be directly beneath the die means 261. This is believed to be clear without further illustration. Since the machine of FIG. 22 is identical to that shown in FIGS. 14–21, with the exception just noted, the same reference characters, where applicable, have been used.

Features and advantages other than those enumerated will readily occur to those versed in the art, as will many modifications and alterations in the preferred embodiments disclosed, all without departure from the spirit and scope of the invention.

What is claimed is:

1. Apparatus for making compressed wafers from forage crops, comprising: a mobile frame having a longitudinal axis extending in the direction of travel of said frame, crop wafering means carried by the frame and including a plurality of die cells arranged in a circular series about a transverse horizontal axis and compression means rotatable about a transverse horizontal axis and cooperative with said cells to compress crops into and through said cells to form wafers, an input shaft journaled on a transverse horizontal axis and connected to and for driving said compression means, a power plant carried on the frame to the rear of and generally in longitudinal alinement with the wafering means and having an output shaft rotatable on a transverse horizontal axis, crop pick-up means carried by and projecting from a forward portion of the frame ahead of and generally in longitudinal alinement with the wafering means and having an input shaft rotatable on a transverse horizontal axis, and drive means connected among the output shaft and the two input shafts and including fore-and-aft extending flexible drive elements.

2. The invention defined in claim 1 in which one of said elements is a belt drive from the power plant to the input shaft for the wafering means.

3. The invention defined in claim 1, including conveyor means carried by the frame for receiving wafers from the wafering means and extending from the wafering means rearwardly beyond the power plant, and means for driving said conveyor means from power derived from said power plant.

4. The invention defined in claim 1, in which the die cells are arranged as an annulus having an inner peripheral track and the compression means includes a carrier shaft on the annulus axis and press wheel means eccentric to the annulus axis and carried by said carrier shaft so that the peripheral portions of said press wheel means rolls about said track, and the input shaft for the wafering means is coaxially connected to said carrier shaft.

5. The invention defined in claim 4, including: auger means coaxially carried by and rotatable with the carrier shaft and operative to receive crops from the pick-up means and to feed such crops to the track of the annulus.

6. Apparatus for making compressed wafers from forage crops, comprising: a mobile frame having a longitudinal axis extending in the direction of travel of said frame, crop wafering means carried by the frame and including an annular series of die cells and rotatable compression means cooperative with said cells to compress crops into and through said cells to form wafers, an input shaft connected to and for driving said compression means, a power plant carried on the frame to the rear of and generally in longitudinal alinement with the wafering means and having an output shaft, crop pick-up means carried by and projecting from a forward portion of the frame ahead of and generally in longitudinal alinement with the wafering means and having an input shaft, and drive means transmitting power from the output shaft to the two input shafts.

7. The invention defined in claim 6, including conveyor means carried by the frame for receiving wafers from the wafering means and extending from the wafering means rearwardly beyond the power plant, and means for driving said conveyor means from power derived from said power plant.

8. The invention defined in claim 6, in which the die cell annulus has an inner peripheral track and the compression means includes a carrier shaft on the annulus axis and press wheel means eccentric to the annulus axis and carried by said carrier shaft so that the peripheral portions of said press wheel means rolls about said track, and the input shaft for the wafering means is coaxially connected to said carrier shaft.

9. The invention defined in claim 6, including: rearwardly moving means for transferring crops from the pick-up means to the wafering means.

10. The invention defined in claim 9, in which said rearwardly moving means includes a rotary device.

11. The invention defined in claim 9, in which said rearwardly moving means includes a flexible endless conveyor.

12. The invention defined in claim 9, in which said rearwardly moving means includes a flexible endless conveyor and a rotary device.

13. Apparatus for making compressed hay wafers from forage crops and comprising, in combination, a mobile frame having a longitudinal axis extending in the direction of travel of said frame, a series of die cells mounted on said frame, rotary hay compression means mounted on said frame and including a rotary drive shaft extending transversely of said axis thereof, said compression means being cooperable with said die cells to compress hay into and therethrough to form wafers, a power plant mounted on said frame to the rear of said compression means and extending substantially coextensively with the latter and including a rotary power output shaft extending parallel to said drive shaft of said compression means, crop pick-up means mounted on and projecting from the forward end of said frame in the forward path of travel thereof and including a rotary drive shaft extending parallel to said shafts of said compression means and power plant, and belt and pulley means transmitting power from said output shaft of said power plant to said drive shaft of said compression means and from the latter to said drive shaft of said pick-up means.

14. Apparatus for making compressed hay wafers from forage crops and comprising, in combination, a mobile frame having a longitudinal axis extending in the direction of travel of said frame, a series of die cells mounted on said frame, rotary hay compression means mounted on said frame and including a rotary drive shaft extending transversely of said axis thereof, said compression means being cooperable with said die cells to compress hay into and therethrough to form wafers, a power plant mounted on said frame to the rear of said compression means and extending substantially coextensively with the latter and including a rotary power output shaft extending parallel to said drive shaft of said compression means, crop pick-up means mounted on and projecting from the forward end of said frame in the forward path of travel thereof and including a rotary drive shaft extending parallel to said shafts of said compression means and power plant, and means transmitting power from said output shaft of said power plant to said drive shaft of said compression means and from the latter to said drive shaft of said pick-up means.

15. Apparatus for making compressed hay wafers from forage crops and comprising, in combination, a mobile frame having a longitudinal axis extending in the direction of travel of said frame, a series of die cells mounted on said frame, rotary hay compression means mounted on said frame and including a rotary drive shaft extending transversely of said axis thereof, said compression means being cooperable with said die cells to compress hay into and therethrough to form wafers, a power plant mounted on said frame to the rear of said compression means and extending substantially coextensively with the latter and including a rotary power output shaft extending parallel to said drive shaft of said compression means, crop pick-up means mounted on and projecting from the forward end of said frame in the forward path of travel thereof and including a rotary drive shaft extending parallel to said shafts of said compression means and power plant, and means transmitting power from said output shaft of said power plant to one end of said drive shaft of said compression means and from the latter to said drive shaft of said pick-up means and extending fore and aft of said frame.

16. The apparatus according to claim 15 further comprising conveyor means for receiving wafers mounted on and extending longitudinally of said frame beneath said series of die cells and beneath said power plant and beyond the rearward end of said frame.

References Cited

UNITED STATES PATENTS

| | | | |
|---|---|---|---|
| 1,127,925 | 2/1915 | Schueler | 107—8 D |
| 2,052,449 | 8/1936 | Connell | 107—8 D |
| 2,887,718 | 5/1959 | Curran et al. | 56—1 |
| 2,958,900 | 11/1960 | Meakin | 107—14 F |
| 3,158,974 | 12/1964 | Peterson et al. | 56—1 |
| 3,249,069 | 5/1966 | Forth | 107—14 F |

ANTONIO F. GUIDA, Primary Examiner

U.S. Cl. X.R.

107—14 F